United States Patent
Walls

(10) Patent No.: US 11,106,522 B1
(45) Date of Patent: Aug. 31, 2021

(54) PROCESS MEMORY RESURRECTION: RUNNING CODE IN-PROCESS AFTER DEATH

(71) Applicant: Oracle International Corporation, Redwood Shores, CA (US)

(72) Inventor: Kevin James Walls, London (GB)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 16/953,858

(22) Filed: Nov. 20, 2020

(51) Int. Cl.
*G06F 11/07* (2006.01)
*G06F 11/30* (2006.01)
*G06F 11/14* (2006.01)

(52) U.S. Cl.
CPC ...... *G06F 11/0778* (2013.01); *G06F 11/0772* (2013.01); *G06F 11/1484* (2013.01); *G06F 11/301* (2013.01); *G06F 2201/84* (2013.01)

(58) Field of Classification Search
CPC . G06F 11/0722; G06F 11/1484; G06F 11/301
USPC .................................. 714/38.11, 45
See application file for complete search history.

(56) References Cited

U.S. PATENT DOCUMENTS

| | | | |
|---|---|---|---|
| 8,984,336 B1 * | 3/2015 | Das ..................... | G06F 11/0778 714/15 |
| 2014/0040671 A1 * | 2/2014 | Akirav ................ | G06F 11/0778 714/45 |
| 2014/0040897 A1 * | 2/2014 | Davis .................. | G06F 11/3096 718/100 |

FOREIGN PATENT DOCUMENTS

CN          107111544 A  *  8/2017   ......... G06F 9/30192

OTHER PUBLICATIONS

GitHub, Aquaxp/Undump Creating executables from ELF-coredumps, available online at <https://github.com/aquaxp/undump>, 2 pages, Jun. 11, 2018.
Google Code Archive, Long-term storage for Google Code Project Hosting, available online at <https://code.google.com/archive/p/undump/>, 1 page, Apr. 1, 2026.
Hacker News, The Emacs dumper dispute, available online at <https://news.ycombinator.com/item?id=13073566>, Dec. 1, 2016, 39 pages.

* cited by examiner

*Primary Examiner* — Chae M Ko
(74) *Attorney, Agent, or Firm* — Invoke

(57) ABSTRACT

In one aspect, a method includes identifying a memory dump generated by an operating system, identifying, within the memory dump, a set of memory segments associated with an instance of a program to map to virtual memory of a new process, loading the set of memory segments into virtual memory of the new process, and performing one or more diagnostics using the program in the new process. Performing the one or more diagnostics using the program in the new process may include calling code associated with the instance of the program and new program code, such as a newly built program that is part of a runtime diagnostic tool.

20 Claims, 6 Drawing Sheets

PROCESS MEMORY RESURRECTION: RUNNING CODE IN-PROCESS AFTER DEATH

TECHNICAL FIELD

The present disclosure relates to techniques for resurrecting process memory and performing diagnostics on processes that have crashed.

BACKGROUND

Complex software systems, such as the Java Virtual Machine (JVM), often have programmatic features directed at checking the current memory state of a process to catch errors and present information for facilitating human understanding of program behavior. However, native runtime diagnostic tools, such as built-in checking or state-printing code, are generally not callable once a process has unexpectedly terminated. Thus, the ability to leverage runtime diagnostic tools to analyze the behavior of a crashed program is limited.

One approach for diagnosing problematic behavior of a "dead" process is to analyze the contents of a memory dump. A memory dump, also referred to as a core or crash dump, is a file or data object that captures the memory state of a process at a given point in time, such as at the time of a crash. Some post-mortem diagnostic tools, such as debuggers, allow memory dump files to be opened and analyzed after a program has unexpectedly terminated. Though these tools may inspect and provide insights about the memory state at the time of the crash, the tools cannot generally run the program once it has already terminated. Further, some of the post-mortem diagnostic tools overlap with available runtime diagnostic tools. The existence of multiple versions of such code generally increases the creation and maintenance burden of these tools.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE SEVERAL VIEWS OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
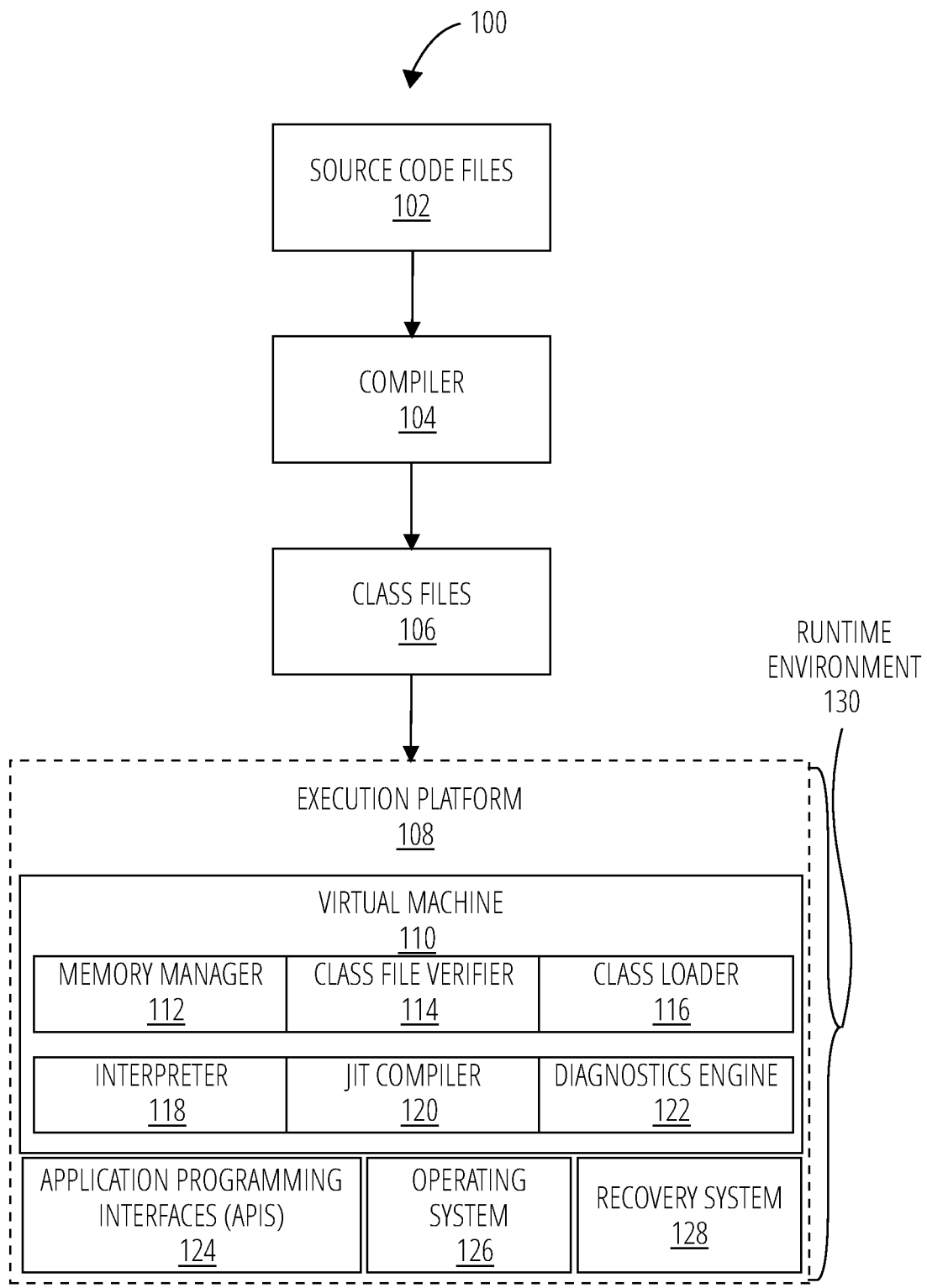
FIG. 1 illustrates a system in which techniques for resurrecting process memory may be practiced in accordance with an embodiment.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. RUNTIME ENVIRONMENTS
3. PROCESS MEMORY RESURRECTION
4. POST-REVIVAL DIAGNOSTICS
5. HARDWARE IMPLEMENTATIONS
6. MISCELLANEOUS; EXTENSIONS

1. GENERAL OVERVIEW

Techniques are described herein for resurrecting process memory. In an embodiment, a recovery system restores the memory of a process into a new running process image. The image may be used to run program code in-process after an instance of the program has crashed or at other snapshots in time during the program's lifecycle. The resurrected process may call diagnostic methods in an application as if the program had not crashed or, in the event that a crash has not occurred, to analyze program behavior at a snapshot in time without needing to halt execution of the program.

In an embodiment, the recovery system is configured to analyze memory dumps to resurrect process memory. In one aspect, the recovery system identifies, within the memory dump, a set of memory segments associated with an instance of a program to map to virtual memory of a new process. A new standalone instance of the process may then load the set of memory segments into virtual memory, resulting in an address space that closely resembles the moment of a crash or snapshot.

In another aspect, the recovery system identifies, within the memory dump, one or more shared libraries associated with the program to run the program code in a new process. The recovery system may copy the shared libraries to a new writable location within memory and edit the shared libraries such that the base address of each shared library is the same address as in the instance of the process for which the memory dump was generated. A new standalone instance of the program may call the program code from the new writable location and open the program shared libraries that have had their base addresses fixed. Once called, the program code for an application may access the virtual memory segments that have been loaded into virtual memory of the new process. The new process may further make references to the program code stored at the new writable location and application data stored in virtual memory.

In another aspect, the new process may invoke new code to analyze program behavior. For example, the process may call diagnostic methods in the application. With process memory revival, the functionality of the runtime diagnostic tools is available after a crash. Thus, the same diagnostics operable on a live process may be used on a revived process, reducing the burden of maintaining separate tools and providing more robust capabilities for analyzing program behavior.

One or more embodiments described in the Specification and/or recited in the claims may not be included in this General Overview section.

2. RUNTIME ENVIRONMENTS

In an embodiment, the techniques described herein are executed within a runtime environment. A runtime environment in this context may include supporting code, tools and/or other hardware/software components that implement a program's execution. One or more components of the runtime environment may vary depending on the programming language of the program's source code, the hardware platform on which the program is executed, the operating system version, and/or other system attributes.

FIG. 1 illustrates example system 100 in which techniques for resurrecting process memory may be practiced in accordance with an embodiment. Software and/or hardware components described with relation to the example architecture may be omitted or associated with a different set of functionality than described herein. Software and/or hardware components, not described herein, may be used within an environment in accordance with some embodiments. Accordingly, the example environment should not be construed as limiting the scope of any of the claims.

As illustrated in FIG. 1, system 100 includes source code files 102 which are compiled by compiler 104 into blueprints representing the program to be executed. Examples of the blueprints include class files 106, which may be loaded and executed by execution platform 108. Execution platform 108 includes runtime environment 130, operating system 126, one or more application programming interfaces (APIS) 124 that enable communication between runtime environment 130 and operating system 126, and recovery system 128 for resurrecting process memory.

In an embodiment, runtime environment 130 includes virtual machine 110 comprising various components, such as memory manager 112 (which may include a garbage collector), class file verifier 114 to check the validity of class files 106, class loader 116 to locate and build in-memory representations of classes, interpreter 118 for executing virtual machine code, and just-in-time (JIT) compiler 120 for producing optimized machine-level code.

In an embodiment, virtual machine 110 includes diagnostic engine 122, which comprises native tools for executing diagnostic functions during program runtime. For example, the java virtual machine (JVM) includes native diagnostics tools for analyzing heap memory, thread stacks, garbage collection, and resource utilization. These tools are generally available only when an instance of the JVM is running. After a program has crashed, access to such native runtime diagnostic tools may be restored by reviving process memory as described further herein.

In an embodiment, source code files 102 contain code written in one or more programming languages, such as Java, C, C++, C #, Ruby, Perl, and so forth. Thus, source code files 102 adhere to a particular set of syntactic and/or semantic rules for the associated language. For example, code written in Java adheres to the Java Language Specification. However, since specifications are updated and revised over time, source code files 102 may be associated with a version number indicating the revision of the specification to which source code files 102 adhere.

In an embodiment, compiler 104 converts the source code, which is written according to a specification directed to the convenience of the programmer, to either machine or object code, which is executable directly by the particular machine environment, or an intermediate representation ("virtual machine code/instructions"), such as bytecode, which is executable by virtual machine 110 that is capable of running on top of a variety of particular machine environments. The virtual machine instructions are executable by virtual machine 110 in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine 110 resides.

In an embodiment, virtual machine 110 includes interpreter 118 and JIT compiler 120 (or a component implementing aspects of both), and executes programs using a combination of interpreted and compiled techniques. For example, the virtual machine 110 may initially begin by interpreting the virtual machine instructions representing the program via the interpreter 118 while tracking statistics related to program behavior, such as how often different sections or blocks of code are executed by the virtual machine 110. Once a block of code surpass a threshold (is "hot"), the virtual machine 110 may invoke the JIT compiler 120 to perform an analysis of the block and generate optimized machine-level instructions which replaces the "hot" block of code for future executions. Since programs tend to spend most time executing a small portion of overall code, compiling just the "hot" portions of the program can provide similar performance to fully compiled code, but without the start-up penalty. Furthermore, although the optimization analysis is constrained to the "hot" block being replaced, there still exists far greater optimization potential than converting each instruction individually. There are a number of variations on the above described example, such as tiered compiling.

In other embodiments, runtime environment 130 may not include a virtual machine. For example, some static and stack-based environments do not execute programs using a virtual machine. A runtime environment may include supporting code, tools and/or other hardware/software components that implement a given program's execution. One or more components of the runtime environment may vary depending on the programming language of the source code, the hardware platform on which the program is executed, and/or the operating system version.

Source code files 102 have been illustrated as the "top level" representation of the program to be executed by execution platform 108. Although system 100 depicts source code files 102 as a "top level" program representation, in other embodiments, source code files 102 may be an intermediate representation received via a "higher level" compiler that processed code files in a different language into the language of source code files 102.

In an embodiment, compiler 104 receives source code files 102 as input and converts the code contained therein into class files 106 that are in a format expected by virtual machine 110. For example, in the context of the JVM, the Java Virtual Machine Specification defines a particular class file format to which class files 106 are expected to adhere. In an embodiment, class files 106 contain the virtual machine instructions that have been converted from source code files 102. However, in other embodiments, class files 106 may contain other structures as well, such as tables identifying constant values and/or metadata related to various structures (classes, fields, methods, and so forth).

In an embodiment, class files 106 or a portion thereof are packaged in shared libraries. An instance of class loader 116 may be created when an instance of a shared library is deployed. The instance of class loader 116 may contain all the class files packaged within the shared library and classes referenced by the shared library. A class may exist in multiple class loaders if the class is packaged in one shared library that is referenced by another shared library.

Figure 2:
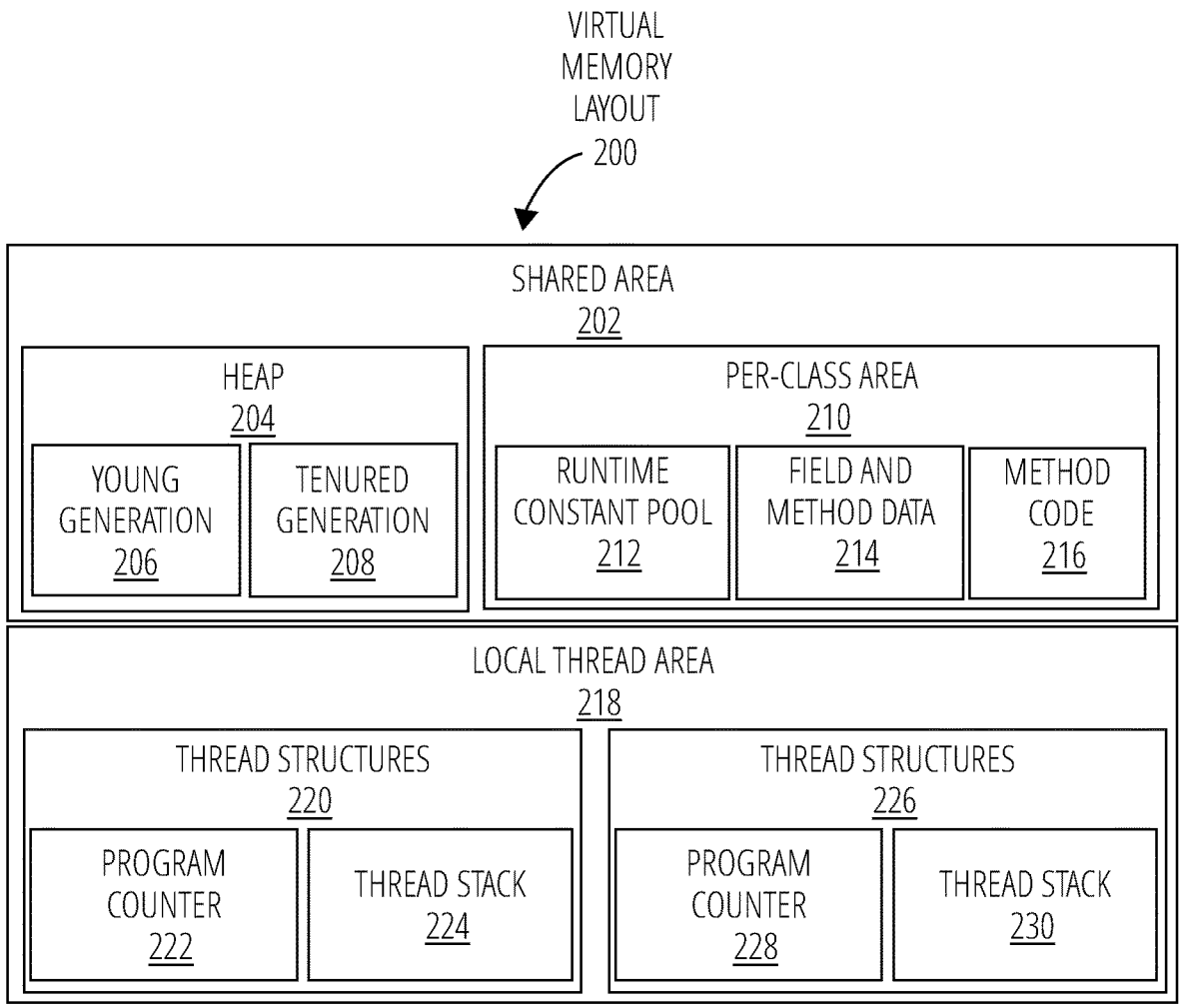
FIG. 2 illustrates an example virtual memory layout in accordance with an embodiment.

FIG. 2 illustrates an example virtual memory layout in accordance with an embodiment; A virtual machine (e.g., virtual machine 110) may adhere to virtual memory layout 200 depicted in FIG. 2. In other embodiments, the memory layout of virtual machine 110 may vary, such as by including additional components and/or omitting one or more of the depicted components, depending on the runtime environment. Although components of virtual memory layout 200 may be referred to as memory areas or allocation regions, there is no requirement that the areas and regions are physically contiguous.

In the example illustrated by FIG. 2, virtual memory layout 200 is divided into shared area 202 and local thread area 218. Shared area 202 represents an area in memory storing structures and objects that are shared among the various threads executing on virtual machine 110. Shared area 202 includes heap 204 and per-class area 210. Local thread area 218 represents an area that stores structures and objects that are local to threads and not shared with other threads. Local thread area 218 may include or correspond to one or more thread local allocation buffers, also referred to as TLABs.

Heap 204 represents an area of memory allocated on behalf of a program during execution of the program. In an embodiment, heap 204 includes young generation 206 and tenured generation 208. Young generation 206 may correspond to regions of heap 204 that stores newly created objects during program execution. When young generation 206 is filled, the oldest objects are promoted to tenured generation 208 to free up space for new objects in young generation 206. Promoting an object may comprise moving the object to a different region and/or reclassifying the object.

Per-class area 210 represents the memory area where the data pertaining to the individual classes are stored. In an embodiment, per-class area 210 includes, for each loaded class, runtime constant pool 212, which represents data from a constant table of the class, field and method data 214 (for example, to hold the static fields of the class), and method code 216, which represents the virtual machine instructions for methods of the class.

As previously mentioned, local thread area 218 represents a memory area where structures specific to individual threads are stored. In FIG. 2, local thread area 218 includes thread structures 220 and thread structures 226, representing the per-thread structures utilized by different threads. In order to provide clear examples, local thread area 218 depicted in FIG. 2 assumes two threads are executing on virtual machine 110. However, in a practical environment, virtual machine 110 may execute any arbitrary number of threads, with the number of thread structures scaled accordingly.

In an embodiment, thread structures 220 include program counter 222 and thread stack 224. Similarly, thread structures 226 include program counter 228 and thread stack 230. Program counter 222 and program counter 228 store the current address of the virtual machine instruction being executed by their respective threads. Thus, as a thread steps through the instructions, the program counters are updated to maintain an index to the current instruction.

In an embodiment, thread stack 224 and thread stack 230 each store stack frames for their respective threads, where each stack frame holds local variables for a function. A frame is a data structure that may be used to store data and partial results, return values for methods, and/or perform dynamic linking. A new frame is created each time a method is invoked. A frame is destroyed when the method that caused the frame to be generated completes. Thus, when a thread performs a method invocation, virtual machine 110 generates a new frame and pushes the frame onto the virtual machine stack associated with the thread.

When a method invocation completes, virtual machine 110 passes back the result of the method invocation to the previous frame and pops the current frame off of the stack. In an embodiment, for a given thread, one frame is active at any point. This active frame is referred to as the current frame, the method that caused generation of the current frame is referred to as the current method, and the class to which the current method belongs is referred to as the current class.

Thread stack 224 and thread stack 230 may correspond to native operating system stacks or virtual thread stacks. Generally, the number of virtual threads executing on a machine is much greater than the number of native threads.

Figure 3:
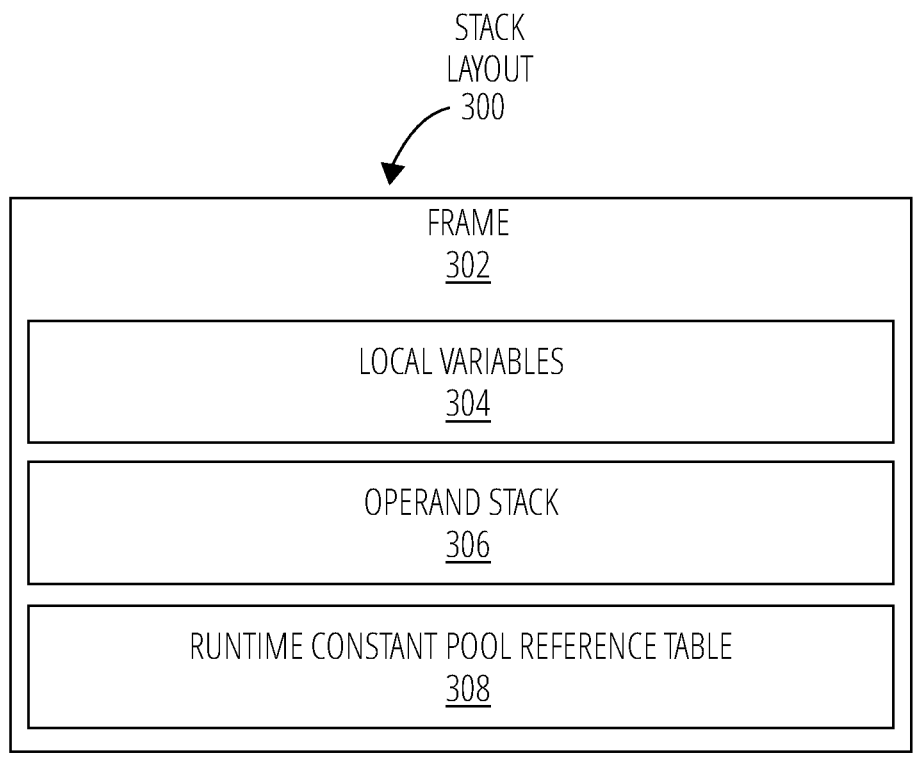
FIG. 3 illustrates an example stack layout in accordance with an embodiment.

FIG. 3 illustrates example stack layout 300 in accordance with an embodiment. In one aspect, frames of a thread stack, such as thread stack 224 and thread stack 230 adhere to the structure of frame 302.

In an embodiment, frame 302 includes local variables 304, operand stack 306, and runtime constant pool reference table 308. Local variables 304 may be represented as an array of variables that each hold a value, for example, Boolean, byte, char, short, int, float, or reference. Further, some value types, such as longs or doubles, may be represented by more than one entry in the array. Local variables 304 may be used to pass parameters on method invocations and store partial results. For example, when generating frame 302 in response to invoking a method, the parameters may be stored in predefined positions within local variables 304, such as indexes 1-$n$ corresponding to the first to $n^{th}$ parameters in the invocation. The parameters may include pointers and other references.

In an embodiment, operand stack 306 is empty by default when frame 302 is created by virtual machine 110. Virtual machine 110 then supplies instructions from method code 216 of the current method to load constants or values from local variables 304 onto operand stack 306. Other instructions take operands from the operand stack 306, operate on them, and push the result back onto operand stack 306. Furthermore, operand stack 306 is used to prepare parameters to be passed to methods and to receive method results. For example, the parameters of the method being invoked could be pushed onto the operand stack 306 prior to issuing the invocation to the method. Virtual machine 110 then generates a new frame for the method invocation where the operands on operand stack 306 of the previous frame are popped and loaded into local variables 304 of the new frame. When the invoked method terminates, the new frame is popped from the virtual machine stack and the return value is pushed onto operand stack 306 of the previous frame.

In an embodiment, runtime constant pool reference table 308 contains a reference to the runtime constant pool of the current class (e.g., runtime constant pool 212). Runtime constant pool reference table 308 is used to support resolution. Resolution is the process whereby symbolic references in the constant pool are translated into concrete memory addresses, loading classes to resolve as-yet-undefined symbols and translating variable accesses into appropriate offsets into storage structures associated with the run-time location of these variables.

3. PROCESS MEMORY RESURRECTION

In an embodiment, recovery system 128 creates an environment in which code can run after a process executing the code has died. A "revival" or "resurrection" process may generally include one or more data segments of the crashed process to virtual memory of a new process and calling parts of the "dead" program code in a manner that provides access to the restored memory as if it were still alive. With memory revival, the functionality of runtime diagnostic tools (e.g., diagnostics engine 122) native to virtual machine 110 may be invoked even after a crash.

Figure 4:
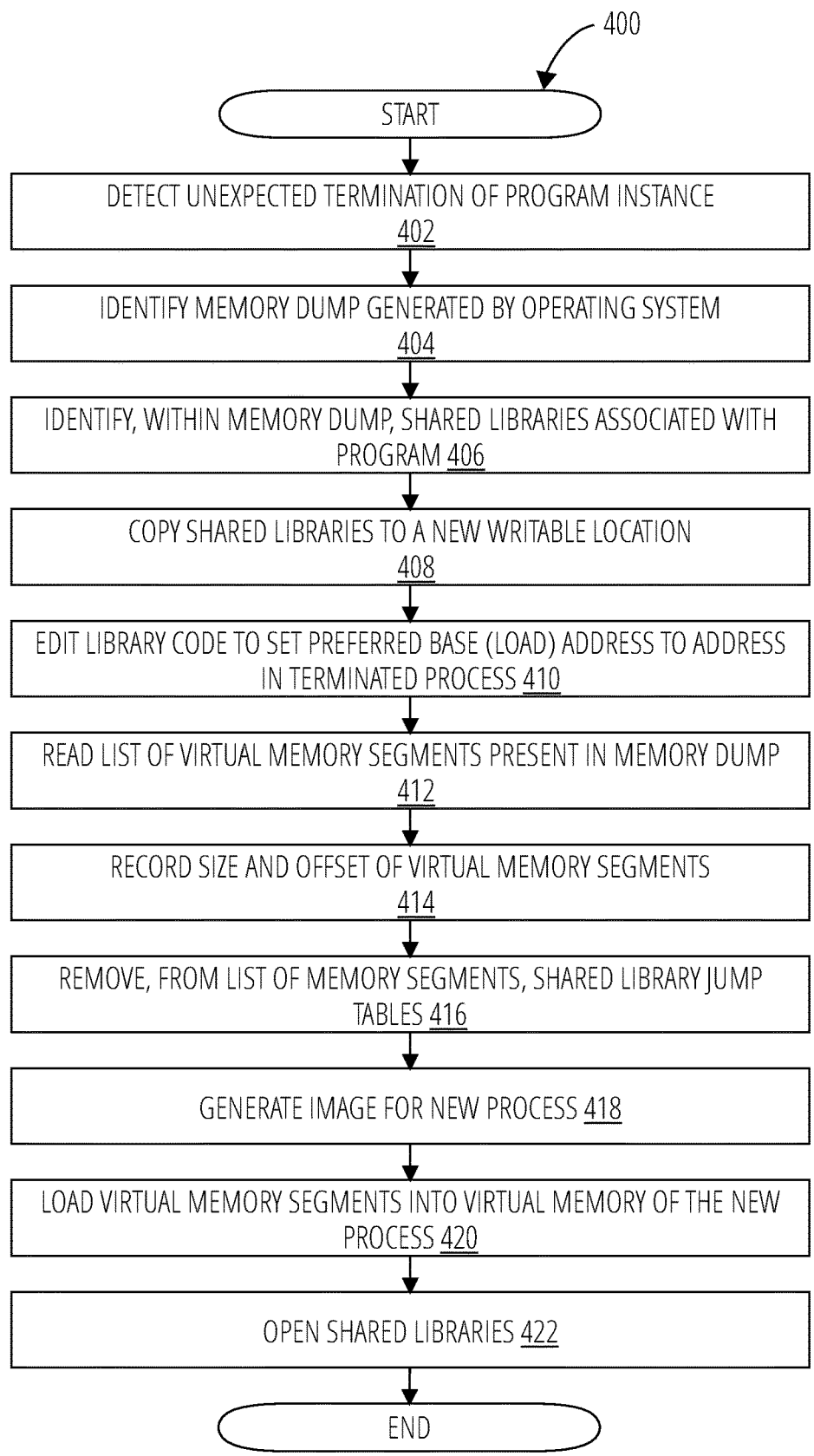
FIG. 4 illustrates an example process for resurrecting process memory in accordance with an embodiment.

FIG. 4 illustrates process 400 for resurrecting process memory in accordance with an embodiment. One or more operations illustrated in FIG. 4 may be modified, rearranged, or omitted all together. Accordingly, the particular sequence of operations illustrated in FIG. 4 should not be construed as limiting the scope of one or more embodiments. Process 400 may be implemented by one or more components of system 100, such as recovery system 128.

Referring to FIG. 4, process 400 detects an unexpected termination of a program instance (operation 402). In an embodiment, a daemon, operating system service, or other process runs external to the application code is configured to check for crashes. For example, operating system 126 may be configured to monitor for faults or other errors indicative that virtual machine 110 has crashed. Responsive to detecting a crash, operating system 126 may generate a memory dump and notify recovery system 128 via APIS 124.

Responsive to detecting an unexpected termination of the program instance, process 400 identifies a memory dump generated by operating system 126 (operation 404). An operating system memory dump may be stored in a file, such as a core file or minidump file, at a particular location which may vary depending on the operating system. The location of the file may be exposed to and configurable by a user. If a program crashes, then process 400 may access the file at the predetermined location.

In an embodiment, process 400 identifies, within the memory dump, shared libraries associated with the crashed program (operation 406). To identify the libraries, process 400 may parse the core file or minidump from a crash to search for references to shared libraries containing object code used to run the crashed program. In the context of the JVM, for instance, references to libjvm.so and/or other shared libraries may be identified in the memory dump. The shared libraries may vary depending on the runtime environment and the program code in the crashed application.

In an embodiment, process 400 copies the identified libraries to a new writable location (operation 408). To copy the shared libraries, process 400 may locate one or more shared library files using references extracted from the memory dump. For example, the process may locate the libjvm.so file and/or other JVM shared libraries within a directory associated with the JVM. The files may be copied from the directory to a new location in volatile or nonvolatile storage.

In an embodiment, process 400 edits the code of the shared libraries to set the preferred base (load) address to the same address in the terminated program instance (operation 410). Process 400 may identify the address for each shared library from the memory dump. Process may then change each base (load) address in the new writable location to match the corresponding base address extracted from the memory dump. The base address, also referred to as the load address, for a library serves as a reference point for other addresses within the code. An absolute address within a shared library may be derived as a function of the base address and a displacement value, such as an offset.

In an embodiment, process 400 reads a list of virtual memory segments present in the memory dump (operation 412). Process 400 may isolate the virtual memory segments associated with the crashed program instance and store these segments in the list. Memory segments from other program instances, if any, may be ignored at this step.

In an embodiment, the memory dump contains virtual memory segments that capture the state of the program memory as it existed at the time that the program instance unexpectedly terminated. For example, the virtual memory segments may capture the current state of shared area 202, including heap 204 and per-class area 210, and local thread area 218, including thread structures 220 and thread structures 226 when the JVM crashes. A core file or minidump, in its raw format as generated by operating system 126, may be a list of binary objects for the crashed program. Recovery system 128 may maintain the raw binary format when copying the list of memory segments or convert the segments to a new format, depending on the implementation.

In an embodiment, process 400 records the size and the offset of the virtual memory segments (operation 414). These attributes may be used to map the virtual memory segments into virtual memory of a new process as discussed further herein.

In an embodiment, process 400 removes, from the list of memory segments shared library jump tables, if any, that include (a) references to locations in the crashed process or (b) references to different versions of libraries than on a runtime environment running the new process (operation 416). Shared jump tables with references to the crashed process may be removed since the references may no longer be valid. Process may further remove shared jump tables with references to different versions of libraries to allow process memory resurrection on machines that are not an exact copy of the machine that had the crash, thereby improving robustness of the approach.

In an embodiment, process 400 generates an image for a new process associated with the program (operation 418). For example, if the JVM crashed, then recovery system 128 may generate an image for a new instance of the JVM. New instances of other programs may also be initialized depending on the runtime environment.

In an embodiment, process 400 loads the virtual memory segments remaining on the list into virtual memory of the new process (operation 420). In one aspect, process 400 maps different segments or segment portions to virtual memory addresses and fills in the memory image of the new process. During this step, process 400 may use the size and offset information to fill in the memory image. For example, process 400 may determine the size of the heap and the location of heap objects relative to fill in heap 204. Similarly, process 400 may fill other parts of shared area 202, such as per-class area 210, and local thread area 218 in the memory image for the new process to match the size and offsets in the dead process.

In an embodiment, process 400 may fill in the memory for multiple threads associated with the program. For example, process 400 may fill in the memory for thread stack 224 and thread stack 230 with frames in a manner that matches the dead process before crashing. Thus, the number of threads and call stacks for each thread may be identical or nearly identical in the new program instance and the crashed program instance.

In an embodiment, process 400 launches the new process, which calls program code to open the shared libraries that have had their bases fixed from in the new writable location (operation 422). Virtual memory for the new process is loaded with the virtual memory segments from the process image. Thus, the new program instance is in an address space that closely resembles the moment of the crash. The new program instance may locate the application and call it, and the application code being called sees the memory as it was at the time of the crash. The program instance may further make references to the application code and data.

In an embodiment, process 400 is used to revive crashed instances of virtual machine 110, which may be an instance of a JVM. For instance, shared libraries native to the JVM, such as libjvm.so, may be copied to the new writable location and edited as described above. With the revived memory, the new instance of virtual machine 110 may have access to shared area 202 and local thread area 218 in an address space substantially matching the crashed instance of virtual machine 110. Third-party libraries that are not native to the JVM may be ignored during the process, even if referenced within the memory dump. The application may not be able to continue execution as normal; however, runtime diagnostic tools may be invoked as if the process had never died.

In the examples above, an environment is created in which code for a crashed process is run as if the process were still alive. Additionally or alternatively, recovery system 128 may create an environment in which code can run that is associated with a given snapshot in a program's execution even though the process has not died. In this case, recovery system 128 may perform operations 404-422 to reconstruct memory for a live process, allowing program behavior to be analyzed in a separate environment. One benefit for this approach is that performance costs that might be incurred from running diagnostics on the original program instance may be mitigated.

4. POST-REVIVAL DIAGNOSTICS

Once process memory has been restored, the new process has the ability to call the existing program code for the program that crashed as well as new program code. Program code may be considered "new" in the sense that it is code for a newly built program instance that was not running at the time of the crash. In one aspect, the new code that is called includes code for a newly built program that is part of a runtime diagnostic tool.

Figure 5:
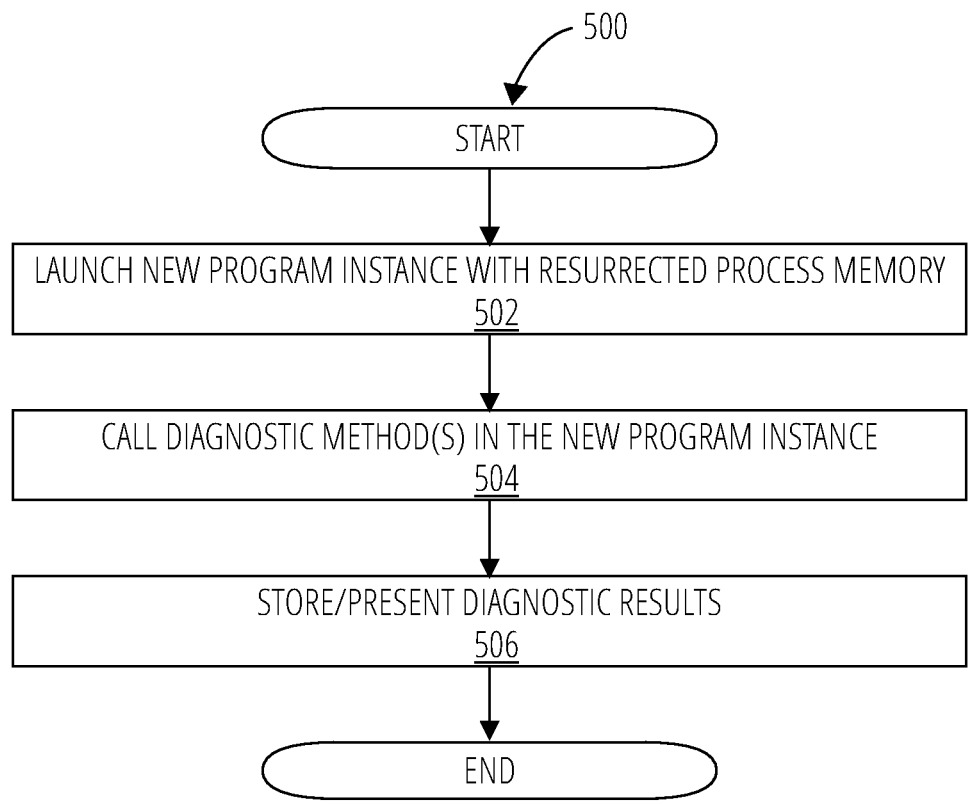
FIG. 5 illustrates an example process for performing diagnostics in a new process as if a program had not crashed in accordance with an embodiment.

FIG. 5 illustrates example process 500 for performing diagnostics in a new process as if a program had not crashed in accordance with an embodiment. One or more operations illustrated in FIG. 5 may be modified, rearranged, or omitted all together. Accordingly, the particular sequence of operations illustrated in FIG. 5 should not be construed as limiting the scope of one or more embodiments. Process 500 may be implemented by one or more components of system 100, such as an instance of virtual machine 110.

In an embodiment, process 500 launches a new program instance with resurrected process memory (operation 502). Process memory may be resurrected as previously described with respect to FIG. 4. In one aspect, this step includes calling program code associated with an original instance of the program for which a memory dump was generated either due to a crash or a snapshot being taken. The called code may include code from one or more shared libraries. For instance, in the context of a JVM, the called code may result in an instance of class loader 116 dynamically loading one or more Java classes into the JVM. Other runtime environments may similarly load class files 106 and/or other program code as this step.

In an embodiment, process 500 calls one or more diagnostic methods in the new program instance (operation 504). As previously indicated, invoking a diagnostic method may comprise calling new program code associated with a diagnostic tool.

The diagnostic functions that are invoked at operation 504 may vary from implementation to implementation. In one aspect, the diagnostic functions may be associated with libraries, programs, or other code native to virtual machine 110. For example, the JVM includes an HPROF tool, which is a dynamically-linked native library for writing heap and CPU profiling information, including CPU usage, heap allocation statistics, and monitor contention profiles. The runtime profiling information may be used to isolate problems involving memory usage and inefficient code.

In an embodiment, an invoked diagnostic tool, such as the HPROF tool, generates a heap dump for the resurrected process memory. A heap dump may be viewed as a runtime-generated dump generated by the application (e.g., an instance of virtual machine 110) as opposed to the memory dump generated by operating system 126. A heap dump may provide more useful insights about memory usage than a raw core file. For example, a heap dump may present text for the names, fields, and offsets of each data object stored in the heap. The heap dump may also present heap allocations statistics, such as the amount of allocation that occurs in various parts of the program. Such information, which may not be readily discernible from the raw core file, may be useful in identifying the source of memory leaks and/or memory-hungry portions of the program code.

Additionally or alternatively, an invoked diagnostic tool may generate a thread dump, which is a snapshot of the state of the threads that are part of the program instance. The state of a thread may be presented with a stack track whereby the contents of a thread's stack are presented. For example, thread dump may present all frames within a thread stack for each thread. A thread dump may help diagnose unwanted program behavior, such as the occurrence of a deadlock.

Additionally or alternatively, other diagnostic tools may be invoked during this operation. Examples include tools for tuning database queries, grouping sets of virtual machine instances together, and tracing transactions. The runtime tools that are native to runtime environment 130 may vary depending on the particular implementation.

In an embodiment, process 500 stores and/or presents the results of the called diagnostic method(s) (operation 506). For example, process 500 may store and/or present, via a display, a heap dump, thread dump, and/or other diagnostic results.

5. HARDWARE IMPLEMENTATIONS

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 6:
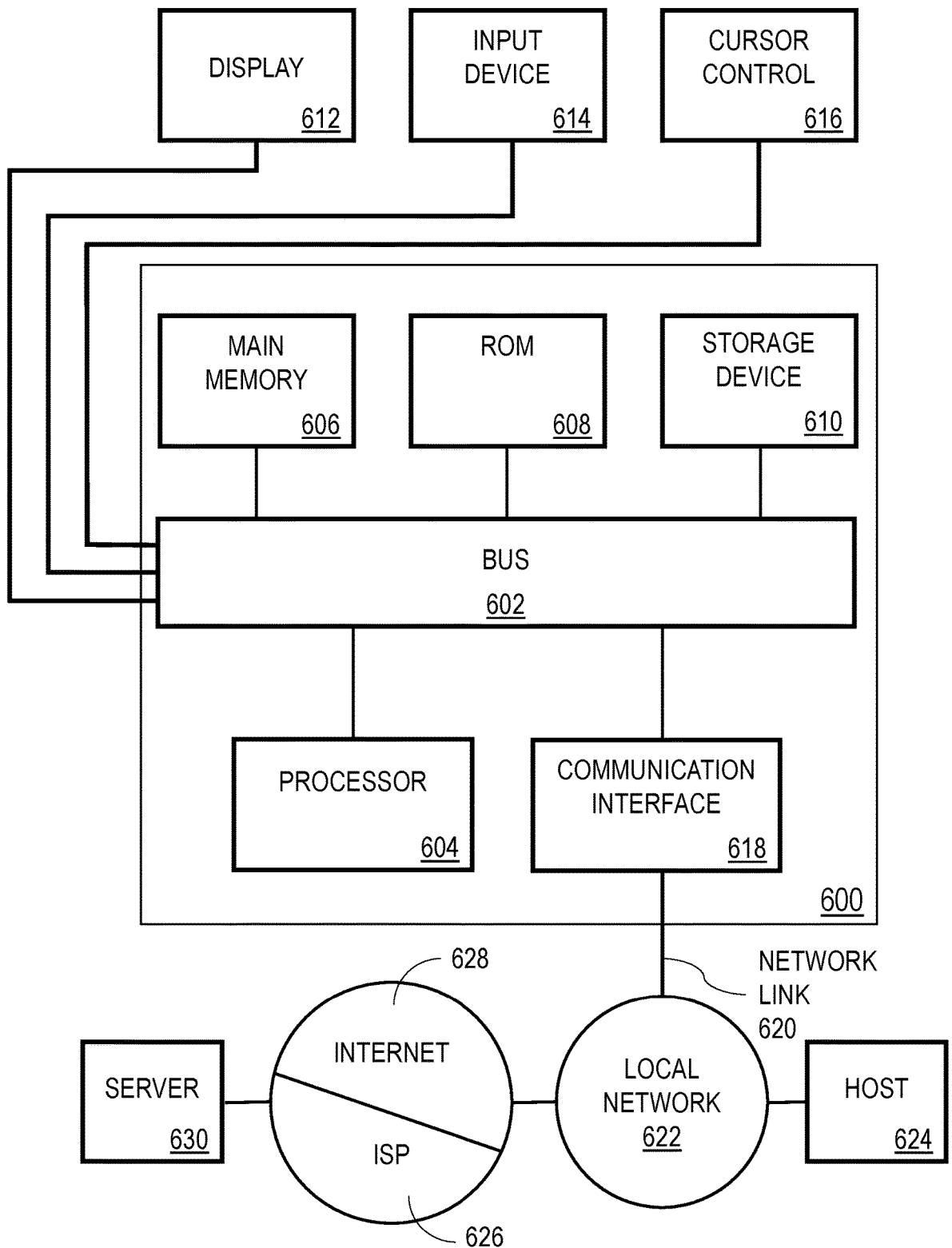
FIG. 6 illustrates an example computing system on which an embodiment may be implemented.

For example, FIG. 6 illustrates computing system 600 on which an embodiment may be implemented. Computer system 600 includes bus 602 and/or other communication mechanisms for communicating information, and hardware processor 604 coupled with bus 602 for processing information. A hardware processor 604 may be, for example, a general-purpose microprocessor.

The computer system 600 also includes main memory 606, such as a random-access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computing system 600 into a special-purpose machine that is customized to perform the operations specified in the instructions.

Computing system 600 further includes read only memory (ROM) 608 or other static storage device coupled to bus 602 for storing static information and instructions for processor 604. Storage device 610, such as a magnetic disk or optical disk, is provided and coupled to bus 602 for storing information and instructions.

Computing system 600 may be coupled via bus 602 to display 612, such as a cathode ray tube (CRT) or light emitting diode (LED) monitor, for displaying information to a computer user. Input device 614, which may include alphanumeric and other keys, is coupled to bus 602 for communicating information and command selections to processor 604. Another type of user input device is cursor control 616, such as a mouse, a trackball, touchscreen, or cursor direction keys for communicating direction information and command selections to processor 604 and for controlling cursor movement on display 612. Input device 614 typically has two degrees of freedom in two axes, a first axis (e.g., x) and a second axis (e.g., y), that allows the device to specify positions in a plane.

Computing system 600 may implement the techniques described herein using customized hard-wired logic, one or more ASICs or FPGAs, firmware and/or program logic which in combination with the computer system causes or programs computing system 600 to be a special-purpose machine. According to one embodiment, the techniques herein are performed by computing system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a network line, such as a telephone line, a fiber optic cable, or a coaxial cable, using a modem. A modem local to computing system 600 can receive the data on the network line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computing system 600 also includes communication interface 618 coupled to bus 602. Communication interface 618 provides a two-way data communication coupling to network link 620 that is connected to local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to host computer 624 or to data equipment operated by Internet Service Provider (ISP) 626. ISP 626 in turn provides data communication services through the worldwide packet data communication network now commonly referred to as the "Internet" 628. Local network 622 and the Internet 628 both use electrical, electromagnetic or optical signals that carry digital data streams. The signals through the various networks and the signals on network link 620 and through communication interface 618, which carry the digital data to and from computing system 600, are example forms of transmission media.

Computing system 600 can send messages and receive data, including program code, through the network(s), network link 620 and communication interface 618. In the Internet example, server 630 might transmit a requested code for an application program through the Internet 628, ISP 626, local network 622 and communication interface 618.

The received code may be executed by processor 604 as it is received, and/or stored in storage device 610, or other non-volatile storage for later execution.

6. MISCELLANEOUS; EXTENSIONS

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   identifying a memory dump generated by an operating system;
   identifying, within the memory dump, a set of memory segments associated with an instance of a program to map to virtual memory of a new process;
   loading the set of memory segments into virtual memory of the new process; and
   performing one or more diagnostics using the program in the new process, wherein performing the one or more diagnostics using the program in the new process includes calling code associated with the instance of the program and new program code.

2. The method of claim 1, wherein performing the one or more diagnostics using the program in the new process further comprises generating, using the program, a second memory dump that provides a snapshot of objects in the virtual memory of the new process.

3. The method of claim 1, wherein performing the one or more diagnostics using the program in the new process further comprises generating, using the program, a thread dump for the new process.

4. The method of claim 1, wherein the one or more diagnostics are native to a virtual machine.

5. The method of claim 1, wherein the memory dump is generated by the operating system for the instance of the program responsive to detecting that the instance has crashed.

6. The method of claim 5, wherein the set of memory segments is loaded into the virtual memory of the new process at the same virtual memory location as before the instance of the program crashed.

7. The method of claim 1, further comprising: identifying, based on the memory dump, one or more shared libraries associated with the instance of the program; copying the one or more shared libraries associated with the instance of the program to a new writable location; and editing an address for the one or more shared libraries to match corresponding addresses in the memory dump.

8. The method of claim 1, wherein identifying, within the memory dump, the set of memory segments associated with the instance of the program to map to virtual memory of the new process comprises: reading a list of virtual memory segments present in the memory dump; and recording a size and offset for each virtual memory segment present in the memory dump.

9. The method of claim 1, wherein identifying, within the memory dump, the set of memory segments associated with the instance of the program to map to virtual memory of the new process comprising removing, from a list of memory segments one or more shared library jump tables that include (a) references to locations in a previous process or (b) references to different versions of libraries than on a runtime environment running the new process.

10. A non-transitory computer-readable storage medium storing instructions that when executed by at least one computing device, cause operations comprising:
    identifying a memory dump generated by an operating system;
    identifying, within the memory dump, a set of memory segments associated with an instance of a program to map to virtual memory of a new process;
    loading the set of memory segments into virtual memory of the new process; and
    performing one or more diagnostics using the program in the new process, wherein performing the one or more diagnostics using the program in the new process includes calling code associated with the instance of the program and new program code.

11. The computer-readable storage medium of claim 10, wherein performing the one or more diagnostics using the program in the new process further comprises generating, using the program, a second memory dump that provides a snapshot of objects in the virtual memory of the new process.

12. The computer-readable storage medium of claim 10, wherein performing the one or more diagnostics using the program in the new process further comprises generating, using the program, a thread dump for the new process.

13. The computer-readable storage medium of claim 10, wherein the one or more diagnostics are native to a virtual machine.

14. The computer-readable storage medium of claim 10, wherein the memory dump is generated by the operating system for the instance of the program responsive to detecting that the instance has crashed.

15. The computer-readable storage medium of claim 14, wherein the set of memory segments is loaded into the virtual memory of the new process at the same virtual memory location as before the instance of the program crashed.

16. The computer-readable storage medium of claim 10, wherein the instructions, when executed by at least one computing device, further cause operations comprising: identifying, based on the memory dump, one or more shared libraries associated with the instance of the program; copying the one or more shared libraries associated with the instance of the program to a new writable location; and editing an address for the one or more shared libraries to match corresponding addresses in the memory dump.

17. The computer-readable storage medium of claim 10, wherein identifying, within the memory dump, the set of memory segments associated with the instance of the program to map to virtual memory of the new process comprises: reading a list of virtual memory segments present in the memory dump; and recording a size and offset for each virtual memory segment present in the memory dump.

18. The computer-readable storage medium of claim 10, wherein identifying, within the memory dump, the set of memory segments associated with the instance of the program to map to virtual memory of the new process comprising removing, from a list of memory segments one or more shared library jump tables that include (a) references to locations in a previous process or (b) references to different versions of libraries than on a runtime environment running the new process.

19. A computing system comprising:
at least one hardware processor; and
at least one non-transitory computer-readable medium storing instructions that, when executed by the at least one hardware processor, cause the computing system to:
identify a memory dump generated by an operating system;
identify, within the memory dump, a set of memory segments associated with a program to map to virtual memory of a new process;
load the set of memory segments into virtual memory of the new process; and
perform one or more diagnostics using the program in the new process, wherein performing the one or more diagnostics using the program in the new process includes calling code associated with the instance of the program and new program code.

20. The computing system of claim 19, wherein performing the one or more diagnostics using the program in the new process comprises generating, using the program, a second memory dump that provides a snapshot of objects in the virtual memory of the new process.

* * * * *

UNITED STATES PATENT AND TRADEMARK OFFICE
CERTIFICATE OF CORRECTION

| | | |
|---|---|---|
| PATENT NO. | : 11,106,522 B1 | Page 1 of 1 |
| APPLICATION NO. | : 16/953858 | |
| DATED | : August 31, 2021 | |
| INVENTOR(S) | : Walls | |

It is certified that error appears in the above-identified patent and that said Letters Patent is hereby corrected as shown below:

In the Specification

In Column 3, Line 56, delete "C #," and insert -- C#, --, therefor.

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*